United States Patent
McCabe

(10) Patent No.: US 7,366,187 B2
(45) Date of Patent: Apr. 29, 2008

(54) LINKING AUTONOMOUS SYSTEMS WITH DUAL PREMISE ROUTING DOMAINS

(75) Inventor: Alan J. McCabe, Cary, NC (US)

(73) Assignee: Verizon Business Global LLC, Basking Ridge, NJ (US)

( * ) Notice: Subject to any disclaimer, the term of this patent is extended or adjusted under 35 U.S.C. 154(b) by 881 days.

(21) Appl. No.: 10/417,533

(22) Filed: Apr. 17, 2003

(65) Prior Publication Data

US 2004/0208175 A1    Oct. 21, 2004

(51) Int. Cl.
*H04L 12/28* (2006.01)
(52) U.S. Cl. .................. 370/401; 370/352; 370/392
(58) Field of Classification Search .................. None
See application file for complete search history.

(56) References Cited

U.S. PATENT DOCUMENTS

| | | | |
|---|---|---|---|
| 5,790,548 A * | 8/1998 | Sistanizadeh et al. ....... | 370/401 |
| 6,870,851 B1 * | 3/2005 | Leinwand et al. .......... | 370/400 |
| 7,006,506 B1 * | 2/2006 | Naik ........................... | 370/397 |
| 2001/0013107 A1 * | 8/2001 | Lewis ......................... | 714/47 |
| 2003/0204619 A1 * | 10/2003 | Bays ........................... | 709/238 |
| 2004/0028064 A1 * | 2/2004 | Cetin et al. .................. | 370/409 |

\* cited by examiner

*Primary Examiner*—Duc Ho

(57) ABSTRACT

The present invention is directed to a system for linking a first autonomous network system to at least one second autonomous network system. The first autonomous network system having a first private IP address space and the at least one second autonomous network system having at least one second private IP address space. The first private IP address space and the at least one second private IP address space are at least partially overlapping. The system includes a first routing domain including the first autonomous network system and at least one second routing domain including the at least one second autonomous network system. A geographically diverse linking autonomous system couples the first autonomous network system and the at least one second autonomous network system. The linking autonomous system includes a first routing domain management system configured to manage the first routing domain, and at least one second routing domain management system configured to manage the at least one second routing domain.

49 Claims, 8 Drawing Sheets

LINKING AUTONOMOUS SYSTEMS WITH DUAL PREMISE ROUTING DOMAINS

BACKGROUND OF THE INVENTION

1. Field of the Invention

The present invention relates generally to telecommunications, and particularly to linking autonomous private network systems.

2. Technical Background

The Internet is comprised of many networks. An autonomous system, which may be part of a larger network, is a system that is administered by a single organization, regardless of whether it is public or private. Public network systems are identified by an IP (Internet Protocol) address. Public IP addresses are obtained from an Internet Registrar. An IP address is used to uniquely identify a host computer connection in an IP network. An IP address is a 32 bit binary number usually represented as 4 fields, each field representing an 8-bit number. They are often written as four decimal numbers separated by decimal points (e.g., for example, 125.115.21.6). However, since many private enterprise network applications do not require network layer connectivity outside the enterprise network, these private networks use unregistered IP addresses.

Private networks often use TCP/IP and its addressing capabilities for intra-enterprise communications. The Internet Assigned Numbers Authority (IANA) has reserved three blocks of IP address space for private internets in IETF RFC 1918. Private networks that do not require access to the Internet may use a block of IP addresses that are re-used by other private networks. IP addresses such as these are said to overlap. Examples of such private networks include private LANs, intranets, virtual private networks (VPNs), and etc.

Currently, it is becoming increasingly important to link private autonomous networks and provide application flows between them. Examples of such applications include business-to-business transactions, purchasing applications over VPNs, banking transactions, procurement applications, and etcetera. Another application relates to private network management. For example, a given company may implement a private intranet that may or may not have advanced features such as connections to the Internet, extranet capability, or whatever. Further, the company may not have the expertise to manage their private network, or the company may determine that the cost of managing their internal intranet is prohibitive. In order to solve the aforementioned problems, companies often outsource the management of their network to a network management company. From the management company's point of view, they want to manage as many customer networks as they can to derive a revenue stream that is as large as possible. Management charges are typically recurring, and are based on the size and number of routers in each customer's network. In order to accomplish this, the management company will attempt to link each of their Network Operations Centers (NOCs) to multiple customer networks.

FIG. 1 is an approach that has been considered. In this approach, the management company's NOC 2 is connected to a first customer network 3 and a second customer network 4 using redundant connections 12. NOC 2 also employs redundant network management systems (NMSs) 21, 22. This works perfectly well in the scenario depicted in FIG. 1 because the TCP/IP version 4-address space used by customer network 3 (10.1.1.0 /24) does not overlap the IP address space used by customer network 4 (10.1.2.0 /24). However, this approach has drawbacks.

A network management company desires to manage as many customer networks as they can in order to derive a larger revenue stream. The first problem relates to adding a large customer network that cannot be renumbered, and uses an address space that overlaps the address space of an existing customer network. Referring to FIG. 1, if the large network to be added (not shown) includes an address block of 10.1.1.0 /24, it will conflict with the corresponding address block of customer network 3 because it is employing the same address space. One way of coping with this problem involves Network Address Translation (NAT).

NAT allows a router to act as an agent between a public network, such as the Internet, and a private autonomous network. This means that only a single, unique IP address is required to represent an entire group of host computers in the private network. Network Address Translation is used by a firewall, router or other computer disposed at the interface between the private network and the rest of the world. NAT is used to map an unregistered IP address to a registered IP address. This can be done on a one-to-one basis, or dynamically. However, NAT does not scale well. NAT requires an in-bound and outbound translation for every node in the coupled system. In a system with a large number of nodes, NAT becomes impractical. Thus, another solution is required.

The second problem with the network management scheme depicted in FIG. 1 relates to the issue of NOC geographic diversity. Assume that the outsourced NOC 2 for every domain is housed in the same physical facility (e.g., Chicago). If a fault condition occurs, such that the facility in Chicago becomes non-functional, all of the Network Management Systems (21, 22) will also be down for as long as the facility is non-functional. As long as the problem exists, the customer networks will not receive the services they contracted for. Obviously, this outcome is unacceptable to both parties.

What is needed is a way to link autonomous systems having overlapping IP addressing schemes without having to renumber, or use NAT. What is also needed is a way to couple geographically diverse and logically related autonomous systems. Furthermore, any solution to the above stated problems must be scalable, such that a large number of networks can be efficiently managed.

SUMMARY OF THE INVENTION

Multi-premise routing domain technology provides an elegant, yet simple, technique to scale geographically diverse, but logically related autonomous systems by coupling them from a routing point of view. Coupled routing domains can easily be scaled using a transit network to link them together. This present invention provides a powerful tool for scaling management of large numbers of customer networks. The present invention can also be used to link any number of autonomous networks for any application. As described above, some of the applications are business-to-business transactions, purchasing over VPNs, banking, procurement, and part distribution systems.

One aspect of the present invention is directed to a system for linking a first autonomous network system to at least one second autonomous network system. The first autonomous network system has a first private IP address space and the at least one second autonomous network system has at least one second private IP address space. The first private IP address space and the at least one second private IP address space are at least partially overlapping. The system includes a first routing domain including the first autonomous network system and at least one second routing domain including the at least one second autonomous network system. A geographically diverse linking autonomous system couples the first autonomous network system and the at least one second autonomous network system. The linking autonomous system includes a first routing domain management system configured to manage the first routing domain, and at least one second routing domain management system configured to manage the at least one second routing domain.

In another aspect, the present invention is directed to a method for linking a first autonomous network system and at least one second autonomous network system. The first autonomous network system has a first private IP address space and the at least one second autonomous network system has at least one second private IP address space. The first private IP address space and the at least one second private IP address space are at least partially overlapping. The method includes implementing a first routing domain including the first autonomous network system. At least one second routing domain is implemented that includes the at least one second autonomous network system. A geographically diverse linking autonomous system is provided that couples the first autonomous network system to the at least one second autonomous network system. The linking autonomous system includes a first routing domain management system configured to manage the first routing domain, and at least one second routing domain management system configured to manage the at least one second routing domain.

In another aspect, the present invention is directed to a computer-readable medium having computer-executable instructions disposed thereon for performing a method for linking a first autonomous network system and at least one second autonomous network system. The first autonomous network system has a first private IP address space and the at least one second autonomous network system has at least one second private IP address space. The first private IP address space and the at least one second private IP address space are at least partially overlapping. The method includes implementing a first routing domain including the first autonomous network system. At least one second routing domain is implemented that includes the at least one second autonomous network system. A geographically diverse linking autonomous system is provided that couples the first autonomous network system to the at least one second autonomous network system. The linking autonomous system includes a first routing domain management system configured to manage the first routing domain, and at least one second routing domain management system configured to manage the at least one second routing domain.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
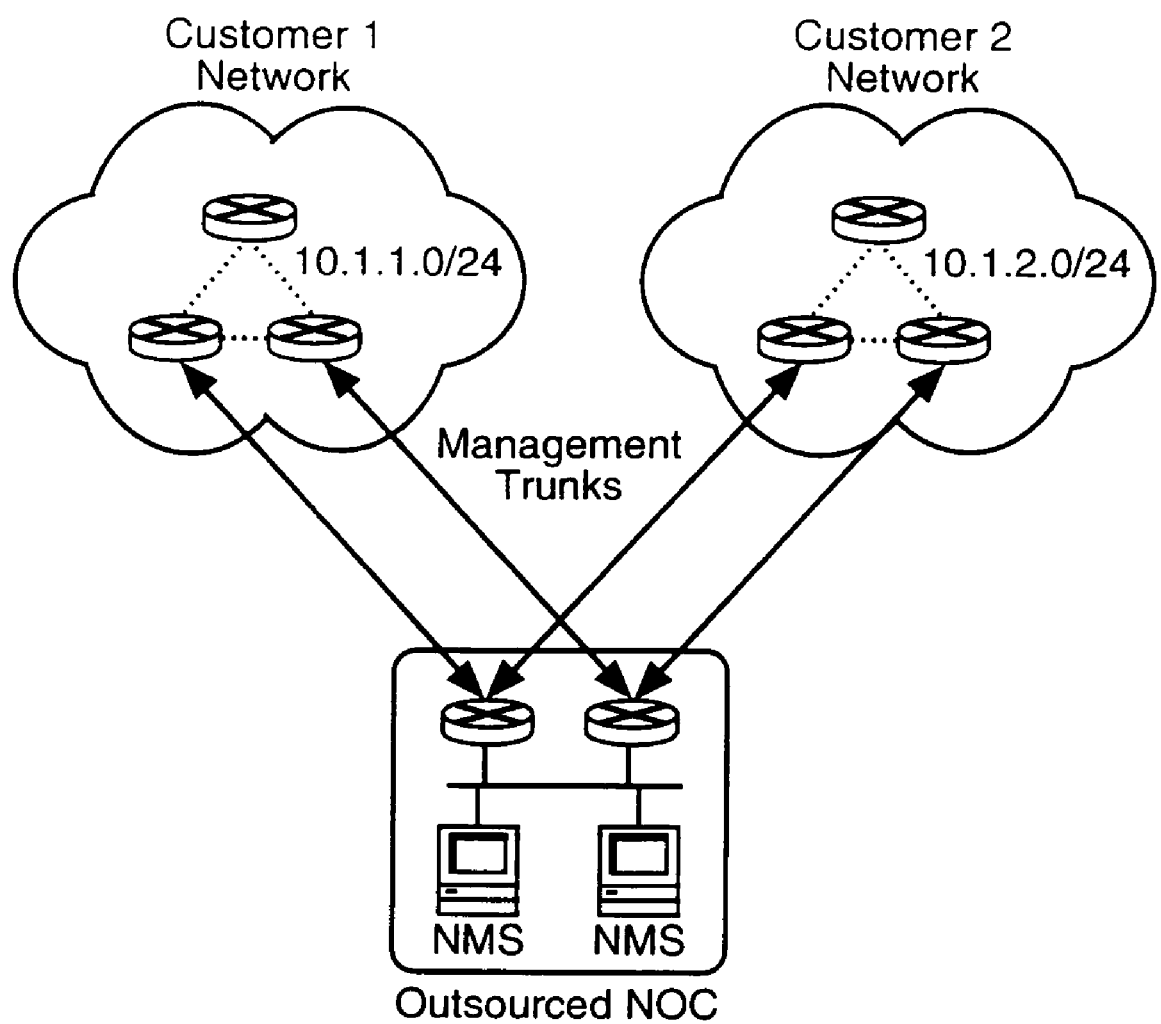
FIG. 1 is a diagram of one related art approach to linking autonomous network systems.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the system of the present invention is shown in FIG. 2, and is designated generally throughout by reference numeral 10.

In accordance with the invention, the present invention is directed to a system for linking a first autonomous network system to at least one second autonomous network system. The first autonomous network system having a first private IP address space and the at least one second autonomous network system having at least one second private IP address space. The first private IP address space and the at least one second private IP address space are at least partially overlapping. The system includes a first routing domain including the first autonomous network system and at least one second routing domain including the at least one second autonomous network system. A geographically diverse linking autonomous system couples the first autonomous network system and the at least one second autonomous network system. The linking autonomous system includes a first routing domain management system configured to manage the first routing domain, and at least one second routing domain management system configured to manage the at least one second routing domain. Multi-premise routing domain technology provides an elegant, yet simple, technique to scale geographically diverse, but logically related autonomous systems by coupling them from a routing point of view. Coupled routing domains can easily be scaled using a transit network to link them together. This present invention provides a powerful tool for scaling management of large numbers of customer networks. The present invention can also be used to link any number of autonomous networks for any application. As described above, some of the applications are business-to-business transactions, purchasing over VPNs, banking, procurement, and part distribution systems.

Figure 2:
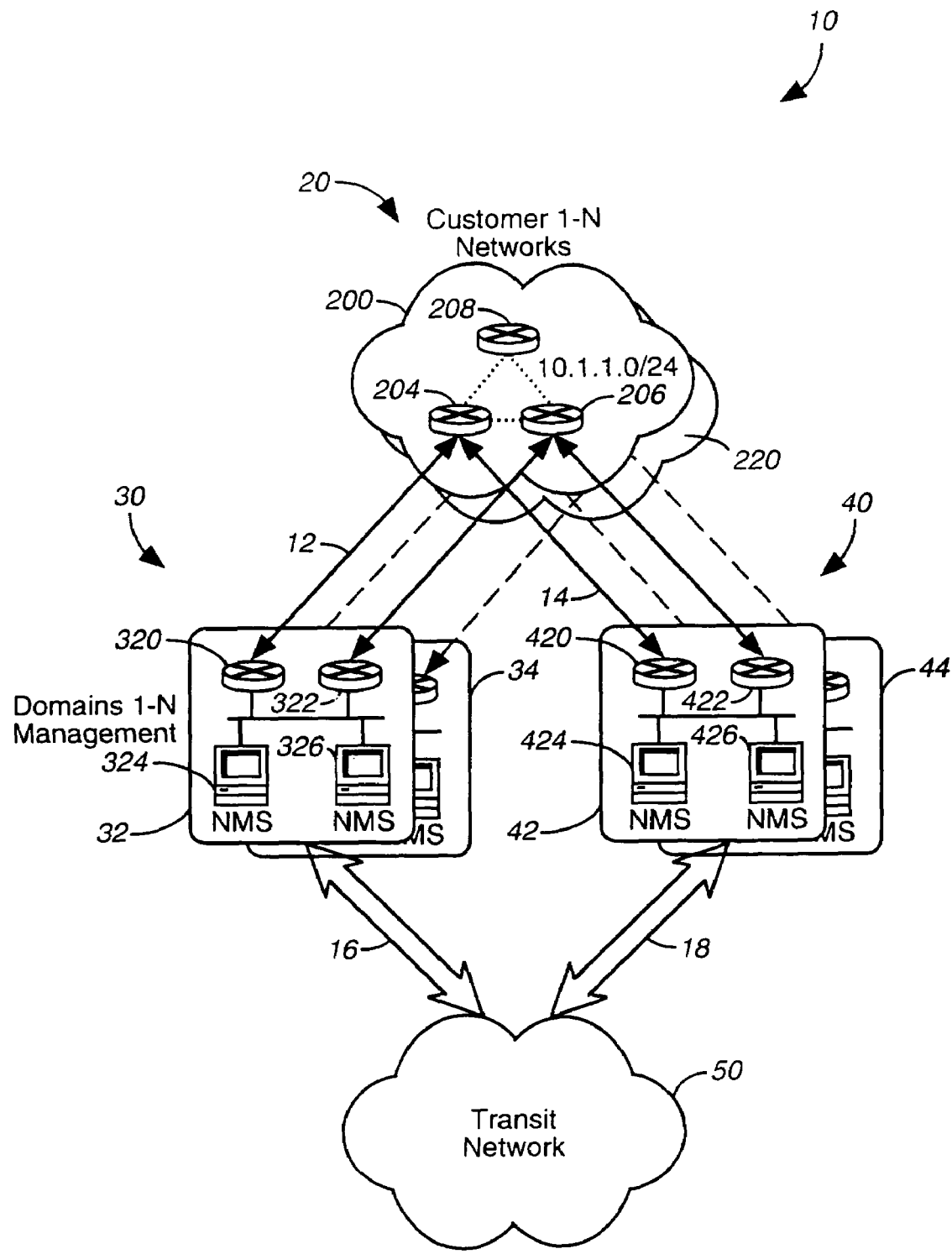
FIG. 2 is a diagrammatic depiction of a system for linking a first autonomous network system and at least one second autonomous network system in accordance with a first embodiment of the present invention.

As embodied herein, and depicted in FIG. 2, a diagram of system 10 for linking autonomous customer networks is disclosed. System 10 is used to link N customer network systems 20, wherein N is an integer. System 10 includes Network Operations Center (NOC) 30 and NOC 40, which are coupled to customer network systems 20. For example, router 204 in customer network system 200 is coupled to router 320 in NOC 30 via communications link 12. Router 204 is also coupled to router 420 in NOC 40 via communications link 14. Similarly, router 206 in customer network system 200 is coupled to router 322 in NOC 30. Router 206 is also coupled to router 422 in NOC 40.

NOC 30 is coupled to NOC 40 by way of transit network 50 via communications links 16 and 18. NOC 30 and NOC 40 are located in diverse geographical areas. As described above, both NOC 30 and NOC 40 include duplicate multiple domain management systems that are coupled to customer network systems 20.

System 10 is logically organized by routing domain. A routing domain is a network infrastructure having access to one 32-bit IP address space. Customer network systems 20 include customer network system 200, which comprises one routing domain, customer network system 220, which comprises another routing domain, and N-2 additional customer network systems that are not shown in FIG. 2 for clarity of illustration. Each customer network system may include a plurality of private autonomous networks having non-overlapping IP address space within the routing domain. For example, customer network system 200 includes router 204, router 206, and router 208 which are configured to route packets in private IP address space 10.1.1.0/24. Those of ordinary skill in the art will recognize that router 208 may represent tens, hundreds, or thousands of routers disposed in customer network system 200. NOC 30 and NOC 40 each include N routing domain management systems. NOC 30 includes domain management system 32, domain management system 34, and N-2 additional domain management systems which also are not shown for clarity of illustration. NOC 40 includes domain management system 42, domain management system 44, and N-2 additional domain management systems, which are also not shown. Customer network system 200 is coupled to domain management system 32 and domain management system 42 to thereby form one routing domain system. Customer network 220 is coupled to domain management system 34 and domain management system 44 to form another routing domain system. Thus, domain management system 32 and domain management system 42 are redundant systems configured to manage the customer network system 200 and the associated routing domain. Likewise, domain management system 34 and domain management system 44 are redundant systems configured to manage the customer network system 220 and the associated routing domain.

NOC geographic diversity is provided by disposing NOC 30 in one geographic location and NOC 40 in another geographic location. For example, NOC 30 may be disposed in Chicago, whereas NOC 40 is disposed in some other city. If the communications facility at NOC 30 (Chicago) experiences a problem, or communications links coupling NOC 30 to the customer networks become degraded or non-functional, such that it is no longer possible to manage customer networks from that facility, customer network management is performed by NOC 40. The degree of geographical diversity required is not so much a function of distance, but rather of fault isolation. Thus, the NOC 40 must provide a degree of fault isolation relative to NOC 30. Besides having geographic diversity and redundant access to the customer network at both NOCs, system 10 also is equipped with redundant Network Management Systems (NMSs) at both NOCs. For example, domain management system 32 includes NMS 324 and NMS 326, whereas domain management system 42 includes NMS 424 and NMS 426. The two sites are logically coupled so that the routing domain has premise in both sites, resulting in substantial efficiency. As will be described in detail below, NOC 30 and NOC 40 are not simply routed together, because transit network 50 can have no knowledge of the intricacies of all the customer networks and their address space. Transit network 50 cannot handle private addressing, because it may be using private addressing itself. According to the present invention, transit network 50 is configured as a transit black box for any complex topology that might be implemented across it.

A description of some of the components in system 10 is as follows. Those of ordinary skill in the art will recognize that in order to handle all of the traffic flow in a large private network, millions of data packets may be traversing the network simultaneously. Thus, the routers employed in the autonomous customer networks, in the NOCs, and in transit network 50 may be of any suitable type depending on anticipated traffic flow. For example, Cisco Systems, Inc. manufactures a series of router devices commonly referred to as the Gigabit Switch Router 12000 Series of routers. These devices are commonly employed in the backbone of the Internet. The 12000 Series uses 200 MHZ R5000 processors. The largest model in the 12000 Series is the 12016 model, which accommodates up to 320 G/bits of data per second and can process up to 60 million data packets per second. Those of ordinary skill in the art will recognize that the routers are sized in accordance with network throughput.

It will be apparent to those of ordinary skill in the pertinent art that modifications and variations can be made to communications links 12 and 14 of the present invention depending on a number of design factors and customer preferences. For example, link 12 and link 14 are typically private communications channels. These channels may be implemented using T-1 lines or ATM. Links 12 and 14 may employ public facilities, as well. For example, NOC 30 may communicate to customer network system 200 by way of the Internet.

The Network Management Systems (NMS) employed by the present invention may be of any suitable type depending on the management functions supported. In one embodiment, the NMS is implemented by a distributed computing system that includes databases, servers, and other computing systems to automate management processes. In one embodiment, the NMS computing system is based on technology provided by SUN Microsystems. The databases employed by the computing system are based on technology provided by ORACLE. A process management/work flow system serves as the core of each NMS. The software is a client-server based middleware that provides graphical process automation, data transformation, event management and flexible connectors to transact with interfacing applications. The client server architecture is employed to integrate various NMS software components. The client server architecture can also be used to gain access to non-NMS components using designated standard interfaces.

Some of the functional areas supported by the NMSs may include fault management, configuration management, accounting, performance management, and security management. Fault management allows the NMSs to detect faults in managed customer networks, and in devices employed in those networks. The NMSs are configured to determine the cause of a particular fault condition and initiate remedial action. Fault management also includes logging fault conditions and performing diagnostics.

Configuration management provides the ability to initialize, reconfigure, operate and de-initialize customer network devices. Configuration management provides the information required by network engineers to ensure that the appropriate hardware and software is in place to provide service. This may involve the creation of a customer profile, and the reconfiguration of network elements. Configuration management may also require the placement of hardware plug-in devices.

The accounting function measures the utilization of individual users or groups to provide billing services. The billing system processes customer event records, the customer pricing plan data, adjustments, taxation and other data in the preparation of customer invoices.

Performance management measures various aspects of the managed networks performance. Statistical data is obtained and analyzed to maintain network performance at an acceptable level.

Security management limits access to certain network resources such that information may not be obtained without authorization. Security management also notifies the appropriate parties in the event of security breaches or attempted security breaches.

It will be apparent to those of ordinary skill in the pertinent art that modifications and variations can be made to transit network 50. By way of example, transit network 50 may include high speed networks that operate at 622 MB/sec (OC-12). Advanced packet switching technology commonly known as the Asynchronous Transfer Mode (ATM) may be employed. Network 50 may also utilize a transmission technology referred to as the Synchronous Optical Network (SONET). These technologies may also be used in combination with one another. For example, the combination of ATM and SONET enables high speed, high capacity voice, data, and video signals to be combined and transmitted on demand. Further, a high speed network may be achieved by connecting Internet Protocol through the ATM switching matrix, and running this combination on the SONET network. The span of transit network 50 is intended to be world-wide. Transit network 50 may include the Internet, private network(s), satellite communications, wireless networks, or a confederation of networks both public and private including the high-speed network described above.

Figure 3:
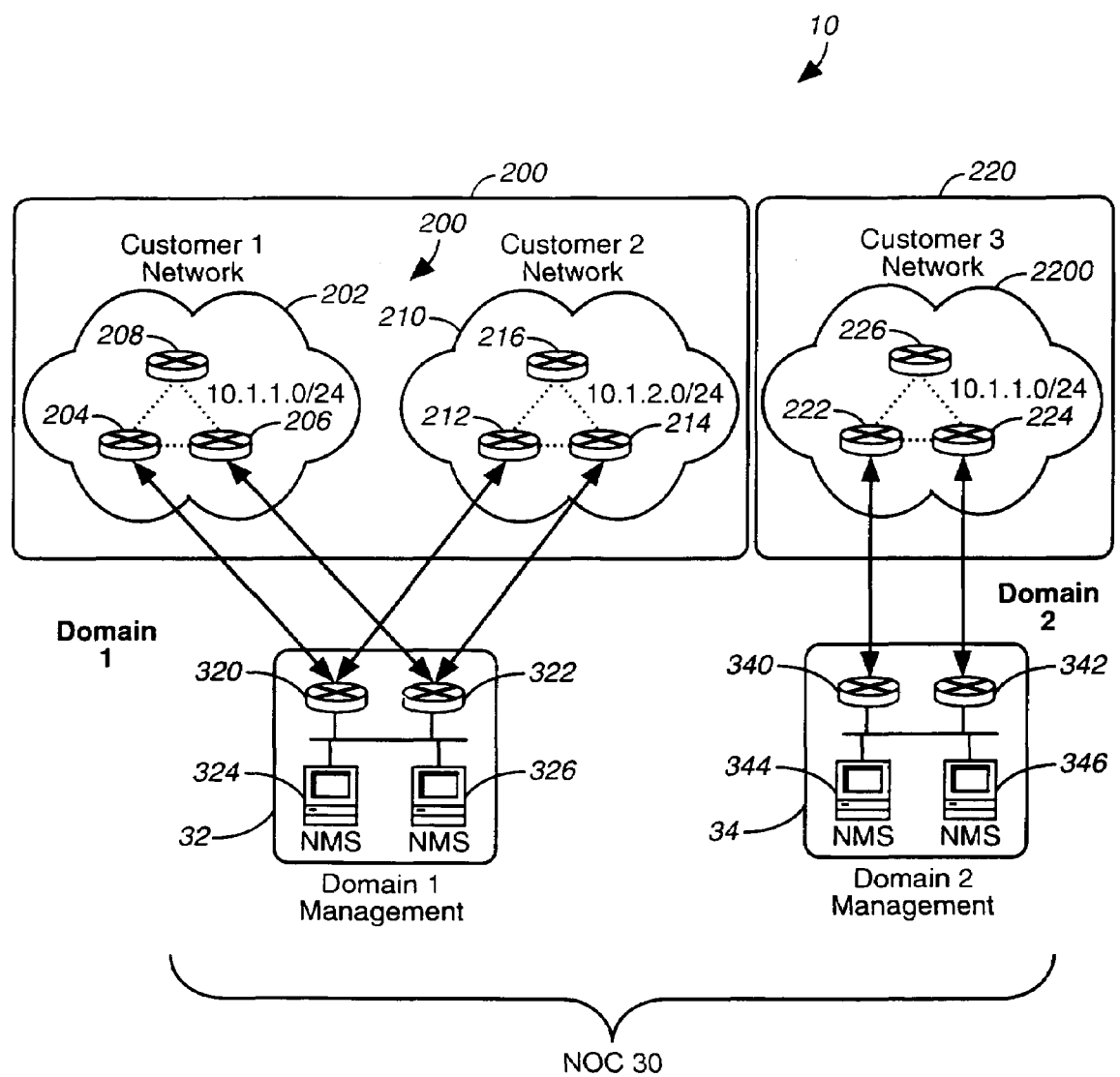
FIG. 3 is a diagram showing the implementation of multiple routing domains in accordance with the present invention.

As embodied herein, and depicted in FIG. 3, a detailed diagram showing the implementation of the multiple routing domains shown in FIG. 2 is disclosed. In this Figure, only a portion of system 10 is shown. For example, the geographic diversity provided by NOC 40 is not shown for clarity of illustration. A depiction of transit network 50 is omitted as well. As shown, domain 1 includes domain management system 32 coupled to customer network system 200. Customer network system 200 includes customer No. 1 network 202 and customer No. 2 network 210. It is important to note that customer network 202 includes private IP address space 10.1.1.0/24, whereas customer network 210 includes private IP address space 10.1.2.0/24. Thus, routing domain No. 1 includes both IP address space 10.1.1.0/24 and non-overlapping IP address space 10.1.2.0/24. Routing domain 2 includes domain management system 34 coupled to customer network system 220. System 220 includes Customer No. 3 network 2200 having private IP address space 10.1.1.0/24, which overlaps the address space of network 202. Customer networks 202 and customer network 2200 cannot be included in the same domain because of their overlapping private addresses, whereas customer network 202 and customer network 210 are in the same domain because of their non-overlapping addresses. When the requirement comes in to support a customer network that overlaps with another customer network, another disjoint routing domain is built to support the new customer network. Multiple sets of customer networks are assigned to various routing domains to ensure that no customer network in a given domain overlaps IP address usage with another customer network in the same domain.

Figure 4:
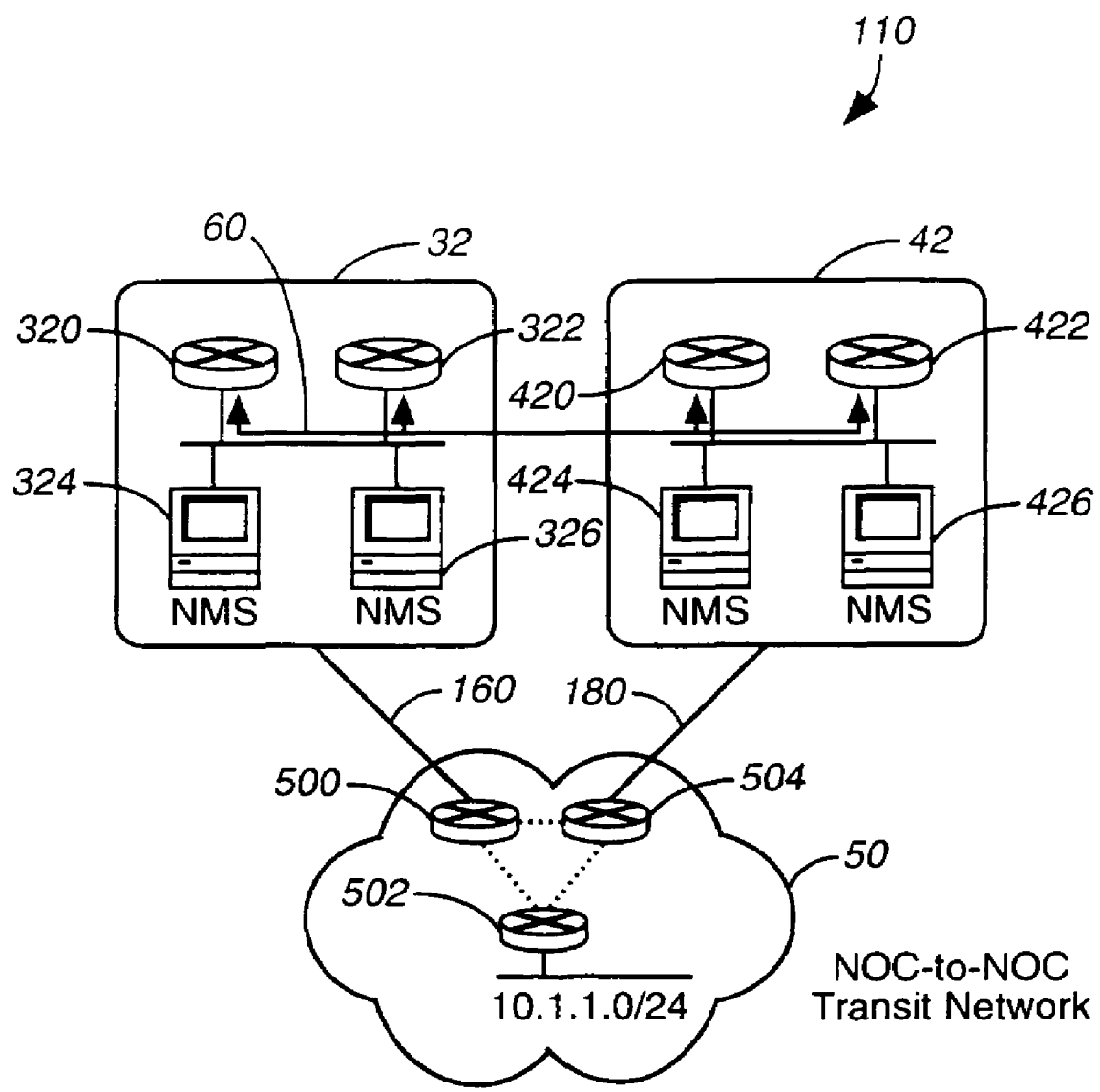
FIG. 4 is a diagram showing a method for coupling routing domain management systems in accordance with the present invention.

Referring to FIG. 4, a detailed diagram showing a method for coupling the routing domain management systems shown in FIG. 2 is disclosed. For clarity of illustration, customer network systems 20, domain management system 34, and domain management system 44 are omitted. Domain management system 32 in NOC 30 is coupled to transit network 50 by way of communications link 160 which is terminated at router 500. Domain management system 42 in NOC 40 is coupled to transit network 50 by way of communications link 180 which is terminated at router 504. Router 502 in transit network 50 may represent tens, hundreds, or even thousands of individual routers disposed in network 50. Routing domain No. 1 management system 32 at NOC 30 is logically coupled to routing domain No. 1 management system 42 at NOC 40 by using peer-to-peer internal Border Gateway Protocol (iBGP) relationship 60. As a result of this logical coupling, both management systems have full knowledge of the domain no. 1 customer network, and either management system can use the other management system to communicate with the domain no. 1 customer network system. This feature of the present invention provides a degree of fault tolerance should there be a single access failure at one of the NOCs. Again, transit network 50 is a black-box network in the sense that it has no knowledge of any of the customer networks, and no knowledge that the NOCs are broken up into multiple domains.

The logical coupling provided by iBGP relationship 60 is implemented as follows. First, router 320 and router 322 in domain management system 32, and router 420 and router 422 in domain management system 42 are configured as iBGP speakers in the same autonomous customer network system (e.g., for the same routing domain) rather than as mirrors representing two different autonomous customer network systems (e.g., for different routing domains). As those of ordinary skill in the art will understand, per the BGP RFC 1771, all BGP speakers for an autonomous customer network system must be fully meshed via iBGP. By way of example, the Ethernet IP addresses of the four routers in the NOCs in FIG. 4 are 10.1.255.2, 10.1.255.3, 10.1.255.252, and 10.1.255.253 from left to right, respectively. Further, the management autonomous system number (ASN) is 65535 for all management domains. This is the last of the private ASNs as described in RFC 1930.

If Cisco routers are employed, each router specifies the other three routers as iBGP neighbors. Thus, router 320 is configured as follows:

```
neighbor 10.1.255.3       remote-as 65535
neighbor 10.1.255.252     remote-as 65535
neighbor 10.1.255.253     remote-as 65535.
```

Further, router 322 is configured as follows:

```
neighbor 10.1.255.2      remote-as 65535
neighbor 10.1.255.252    remote-as 65535
neighbor 10.1.255.253    remote-as 65535.
```

Routers 420 and 422 are configured in the same way. This establishes the iBGP peering relationship between all four speakers. Thus, if the links from NOC 30 to customer network system 200 are down, router 320 and router 322 in NOC 30 are programmed to send packets for customer network system 200 to NOC 40 via NOC-to-NOC transit network 50. Similarly, NOC 40 routers 420 and 422 are programmed to send customer network packets across the transit network if the NOC 2 customer links are down.

As those of ordinary skill in the art will understand, BGP is used to exchange routing information in the Internet. It is also the protocol used between Internet service providers (ISP). Customer networks, such as universities and corporations, usually employ an Interior Gateway Protocol (IGP) such as RIP or OSPF for the exchange of routing information within their networks. When customer networks connect to ISPs, the ISPs use BGP to exchange customer and ISP routes. When BGP is used between autonomous systems, the protocol is referred to as External BGP (eBGP). If routes are being exchanged within an autonomous system, then the protocol is referred to as iBGP. Interestingly enough, the logical coupling of domain management system 32, domain management system 42, and transit network 50 results in an autonomous system in and of itself. Thus, the combination of NOC domain management systems and transit network 50 forms a linking autonomous network disposed between customer network system 200 and customer network system 220.

Figure 5:
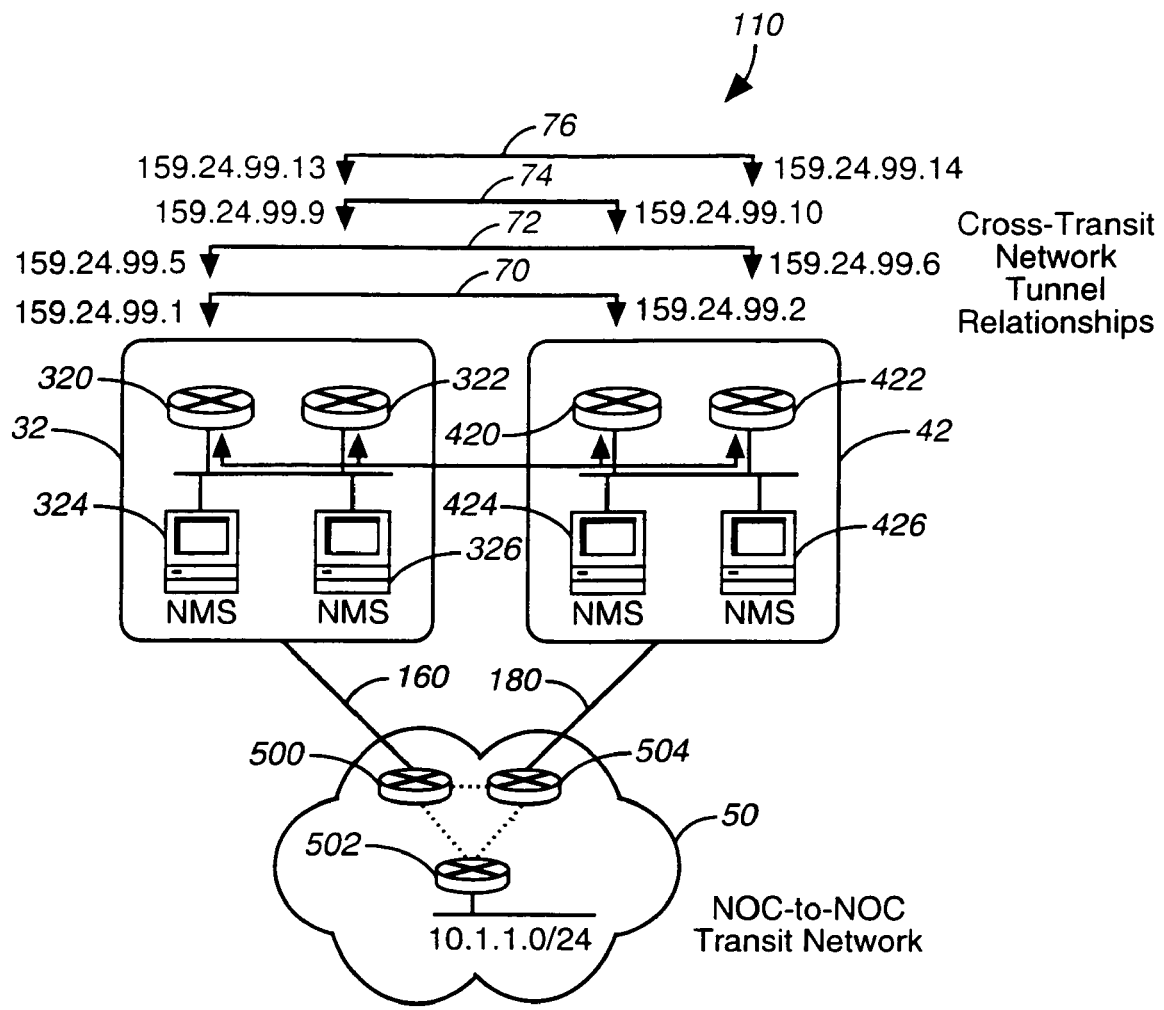
FIG. 5 is a diagram showing an implementation of cross-transit network tunnel relationships between network operations centers in accordance with the present invention.

As embodied herein, and depicted in FIG. 5, a detailed diagram showing an implementation of cross-transit network tunnel relationships between the NOCs depicted in FIG. 2 is disclosed. As discussed above, one salient feature of the present invention is the implementation of transit network 50 as a black-box network that has no knowledge of any of the customer networks, and no knowledge that the NOCs are organized as multiple routing domains. This is implemented by forming cross-transit network tunnel relationship between the routers in domain management system 32 and domain management system 42. Tunnel 70 is created between router 320 and router 420, tunnel 72 is created between router 320 and router 422, tunnel 74 is created between router 322 and router 420, and tunnel 76 is created between router 322l and router 22. Those of ordinary skill in the art will recognize that cross-transit network tunnel relationships must be formed in the other routing domains as well.

The need for tunnels can be seen by examining the relationship between transit network 50 and the two NOCs (30, 40). Assume that private IP address space 10.1.1.0/24 is used in some portion of network 50. This is the same address space used by customer network system 200. If the link between NOC 30 and customer network system 200 is down, and NOC 30 will send data destined for customer network system 200 across transit network 50 to NOC 40, in an attempt to use NOC 40's link to customer network system 200. If tunnels are not employed, confusion will result and transit network 50 will discard the transmitted data. Without the use of tunnels the loss of transparent data would result. Accordingly, in one exemplary embodiment of the invention, tunnels are created between the NOC routers across transit network 50. In doing so, transit network 50 appears to be a single virtual hop between NOC routers. If possible, it is best to use registered addressing for the tunnels to ensure no future private addressing schemes overlap on the tunnels themselves.

The tunnel relationships are implemented as follows. In this example, the IP addresses used for the tunnels are taken from a registered address block (159.24.99.0 /24) owned by the network management company. Again, assuming that routers manufactured by Cisco Systems, Inc. are employed, virtual tunnel interfaces are created by specifying the real Ethernet addresses of the NOC routers as tunnel source and destinations. Using router 320 in NOC 30 as an example, we would create tunnel 70 and tunnel 72 as follows:

```
interface Tunnel 70
    Description tunnel to NOC 40 - router 420
    IP address 159.24.99.1    255.255.255.252
    tunnel source 10.1.255.2
    tunnel destination 10.1.255.252
    crypto map vpn
interface Tunnel 72
    description tunnel to NOC 40 - router 422
    IP address 159.24.99.5    255.255.255.252
    tunnel source 10.1.255.2
    tunnel destination 10.1.255.253
    crypto map vpn
```

In similar fashion, the matching tunnel interface definitions would be added in the other NOC routers. Also note that IPsec encryption maps (VPN) have been applied to the tunnels. This part is optional, but adds a significant security enhancement to the implementation. By virtue of the tunnels, all that is needed is the awareness of the NOC router interfaces across the transit network. This is relatively easy to do with the use of an interior gateway protocol (IGP) like OSPF in the transit network routers, and the NOC routers. In another embodiment, the NOCs/transit network relationship is established between separate autonomous systems. In this embodiment, eBGP is used to drive the links between the autonomous systems.

Those of ordinary skill in the art will understand that the router programming disclosed herein is readily implemented in a computer-readable medium having computer-executable instructions embodied thereon. Further, various forms of computer-readable media may be involved in providing or transmitting these instructions to a processor for execution. The computer-readable medium is capable of being loaded and executed on appropriate computer processing device(s) in order to carry out the method or process steps described. The term "computer-readable medium" as used herein refers to any medium that participates in providing instructions to router processors described herein for execution. Such a medium may take many forms, including, but not limited to, non-volatile media, volatile media, and transmission media. Non-volatile media include dynamic memory, such as RAM 210. Common forms of computer-readable media include, for example, floppy disks, flexible disks, hard disks, magnetic tapes, any other magnetic medium, CD-ROM, CDRWs, DVDs, any other optical medium such as punch cards, paper tape, optical mark sheets, or physical media with patterns of holes, or other optically recognizable indicia. Computer-readable media also obviously includes RAM, PROM, and EPROM, FLASH-EPROM, any other memory chip or cartridge, a carrier wave, or any other medium from which a computer can read.

Figure 6:
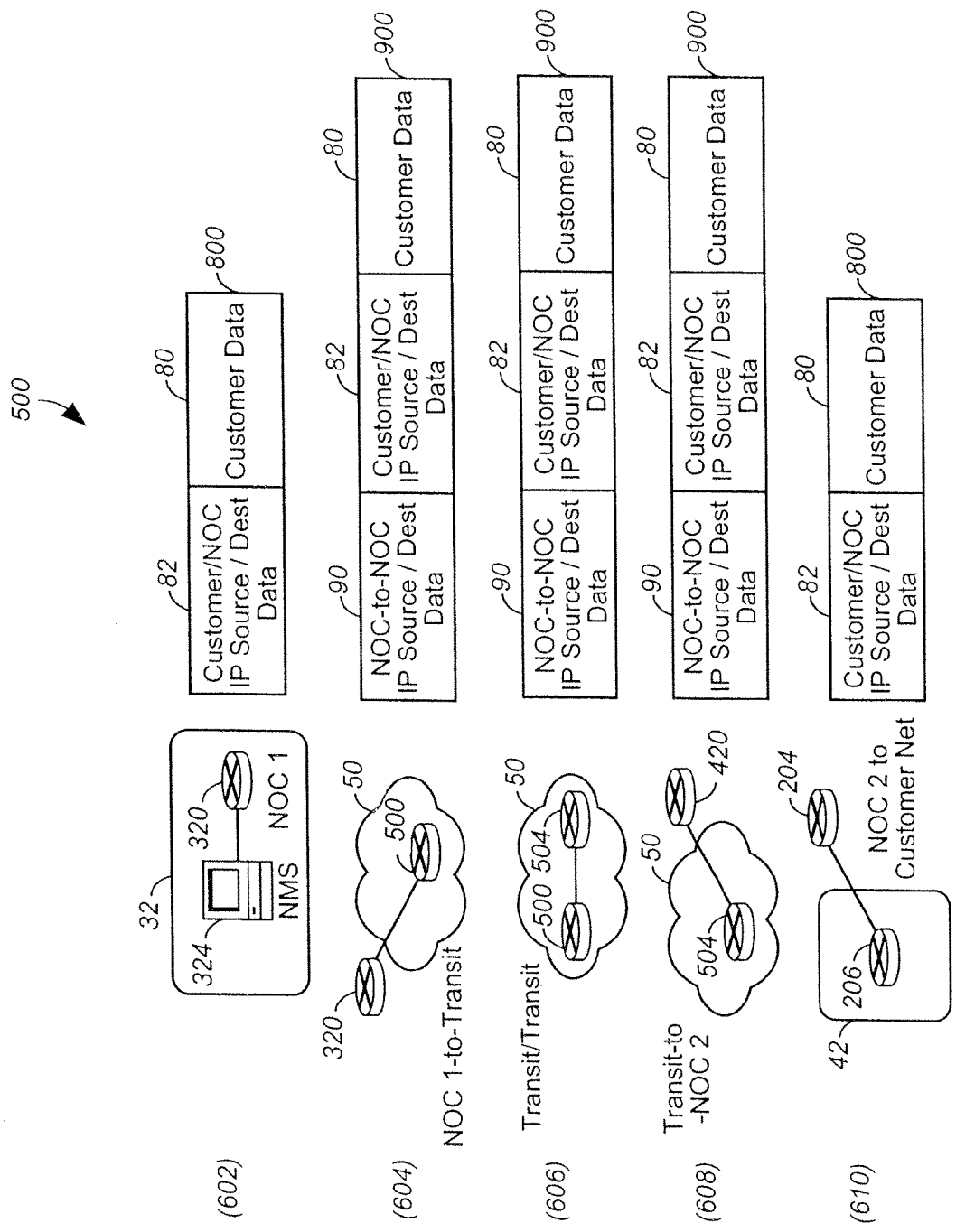
FIG. 6 is a detailed view of the method shown in FIG. 4.

Referring to FIG. 6, a detailed view of the method shown in FIG. 5 is disclosed. When data for a customer's network traverses transit network 50, the packets are encapsulated in tunneling delimiters. The delimiters are added and removed by the NOC routers as they are sent and received across the transit network. Transit network 50 only sees the tunnel source and destination IP addresses in transit packets, thus distinguishing NOC delivery data from the transit packets. In step 602, data packet 800 is transmitted from NMS 324 to router 320. Data packet 800 includes customer data 80 and header 82. Header 82 includes customer/NOC IP address source and destination data. Packet 800 is a simple management domain packet. Router 320 recognizes that the packet has to traverse transit network 50 to get to NOC 40. Router 320 encapsulates management domain packet 800 in tunnel packet 900 for delivery across transit network 50. Thus, transit network 50 has no access to the contents of management domain packet 800 encapsulated in packet 900. Management domain packet 800 could be associated with any of the domains, and it could be destined for a customer network with private IP addressing that overlaps the addressing of transit network 50. Transit network 50 is only concerned about the NOC-to-NOC IP source/destination data contained in header 90 of transit packet 900. Similarly, for the hop across transit network 50, and the hop from transit network 50 to router 420, management domain packet 800 is still encapsulated in tunnel packet 900. In step 610, router 420 strips away the tunnel encapsulation and examines the management domain part of the packet. Router 420 recognizes that management domain packet 800 is destined for customer network system 200, and sends packet 800 to customer network 200.

Tunnels 70, 72, 74, and 76 may be created using any suitable means, but by way of example, IPsec tunnels are implemented on the NOC routers. Those of ordinary skill in the art will recognize that IPsec is a suite of protocols developed by IETF. IPsec includes the authentication header (AH) protocol and the encapsulating security payload (ESP) protocol. As discussed above, tunneling refers to a method for encapsulating an original packet in a tunnel packet. The tunnel packet provides the necessary routing information to enable the packet to traverse network 50, without revealing that the actual source or destination of the packet. The use of the authentication header (AH) protocol provides a very high degree of confidence that a packet has not been altered or tampered with during transmission. The AH protocol allows the receiver of a packet to verify the packet's sender. In doing so, the AH protocol may employ MD5, the U.S. Government's secure hash algorithm, or any other suitable algorithm. The AH protocol can also be used in combination with the ESP when the packet payload requires confidentiality. ESP is a protocol that uses symmetric cryptographic algorithms to encrypt IP data at the packet level. For example, a 56 bit data encryption standard (DES) algorithm may be used to encrypt the payload. In one embodiment, the ESP protocol is employed because it is desirable to both provide packet authentication, and to encrypt the data carried in the packet payload. In one embodiment, an ESP protocol is provided having non-null encryption, authentication, and replay attack prevention modes enabled.

Some may point out that the Network Address Translation (NAT) is an option that can be used to move packets across transit network 50 in a way that distinguishes otherwise overlapping private IP addressed packets. However, those of ordinary skill in the art will recognize that in a single autonomous system-coupling with a large number of nodes, manual management of NAT tables in pairs of transport access routers would quickly become unwieldy. Routers would not have the processing capability to manage NAT tables and packet translation for every source-target pair in the session flow. In the event that system 10 is to be scaled up with multiple autonomous system-couplings, NAT loses any appeal as an option.

Figure 7:
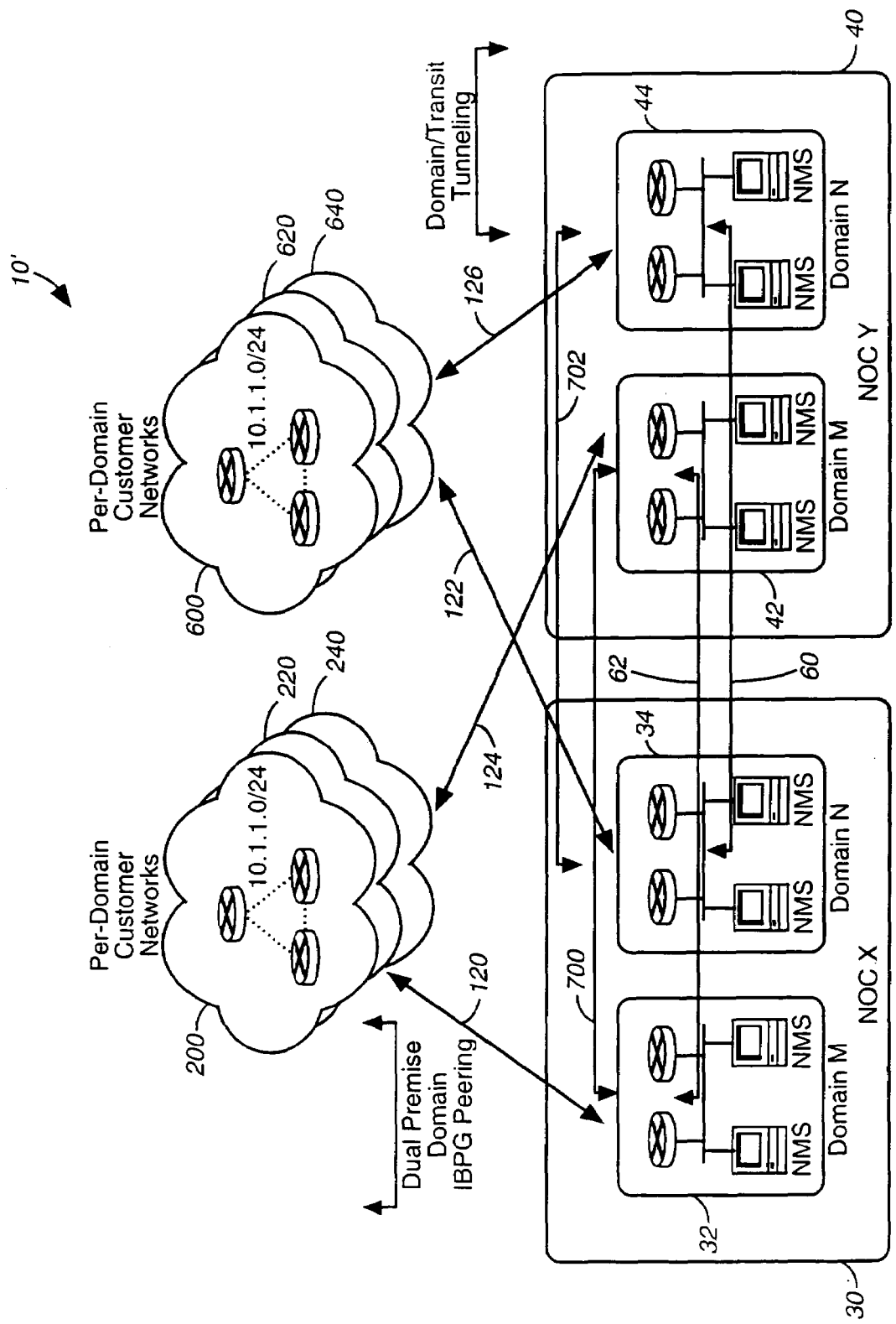
FIG. 7 is a diagrammatic depiction of a system for linking a first autonomous network system and at least one second autonomous network system in accordance with a second embodiment of the present invention.

As embodied herein, and depicted in FIG. 7, a diagram of system 10 for linking multiple autonomous network systems in accordance with a second embodiment of the present invention is disclosed. The connections and system elements shown in FIG. 7 are similar to the connections and elements depicted in FIG. 2. Thus, a description of the elements and their connections is omitted for brevity's sake. In this embodiment, system 10' provides a multi-domain and multi-NOC environment, with geographically diverse management. By using unique tunnels and unique iBGP peering between the management domains, system 10' is implemented very easily. The application of unique tunnels and unique iBGP peering relationships allows system 10 shown in FIG. 2 to scale to system 10'. Those of ordinary skill in the art will recognize that there is no restriction that all paired domains have a presence in every NOC. If we have Z NOCs, we can distribute P domains across the Z NOCs in whatever way system designers choose. Further, system designers can put any number of P domains in each of the Z NOCs. Note that P and Z are integer values greater than two (2). In this way, we expand beyond dual-premise routing domains to multi-premise routing domains (MPRD).

Customers with a network presence in selected geographic areas may want the NOCs to be close by. For example, an Asia-Pacific customer may want management NOCs in Sydney and London, whereas a US customer may want management NOCs in Chicago and London. The use of iBGP peering across transit network tunneling, and eBGP peering between autonomous customer networks enables total flexibility in how traffic flows and in which customer networks are managed at each NOC. BGP features like Local-Preference (Local-Pref) and Multi-Exit Discriminators (MEDs) can and should be used to establish traffic flow patterns desired by network administrators. Load-sharing and primary/secondary traffic path relationships are very easy to configure with judicious use of Local-Pref and MEDs on per-customer-network and per-multi-premise-domain basis.

The Local-Preference attribute is disseminated to all of the routers disposed in the autonomous system. If there are multiple exit points from the autonomous system, the Local-Preference attribute is used to select the exit point for a specific route. The multi-exit discriminator (MED) provides suggested exit points or paths to routers in an external autonomous system. The term suggested is used because the routers may be using other BGP attributes, such as Local-Preference, for route selection. Thus, Local-Pref has precedence over MEDs.

Figure 8:
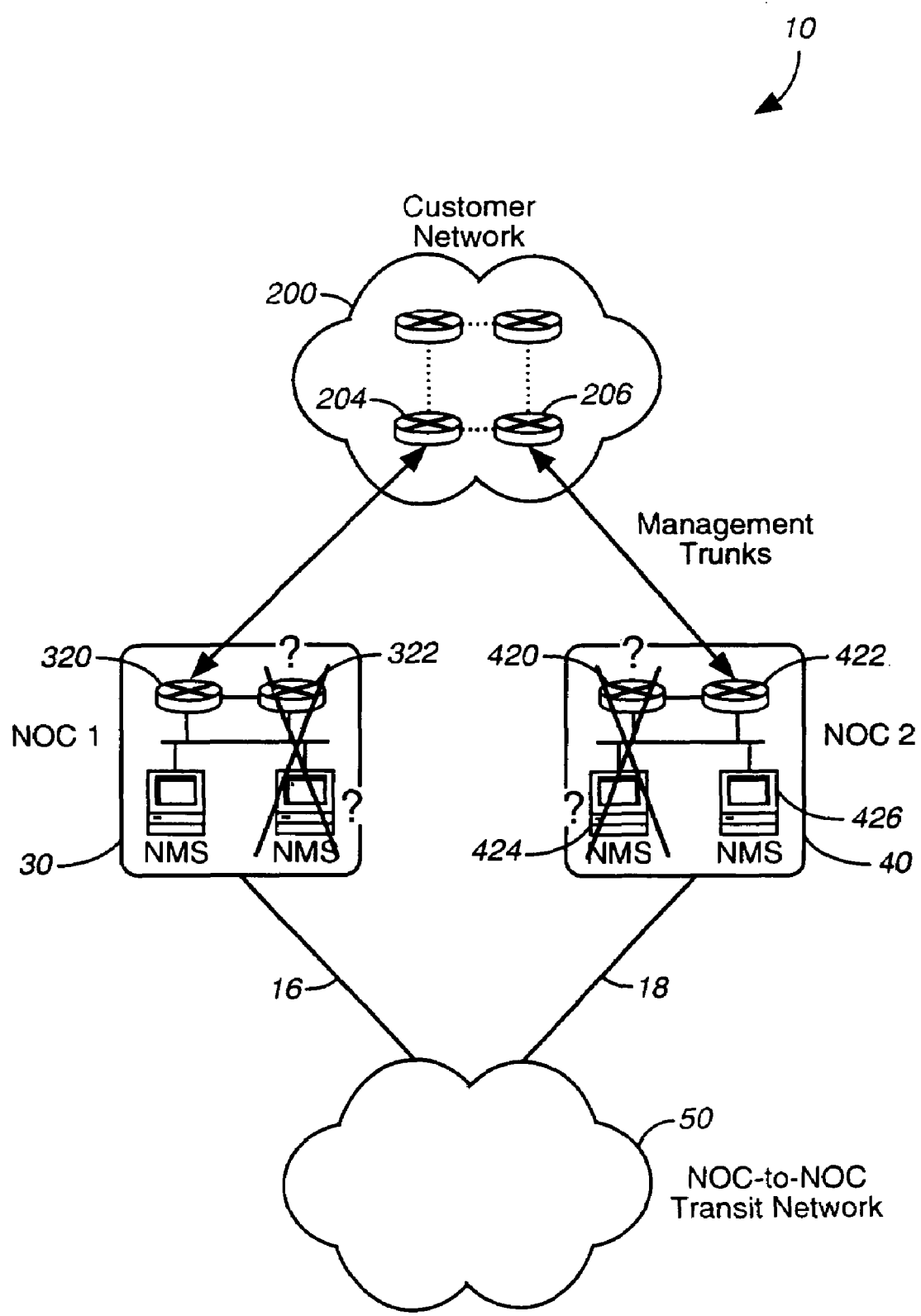
FIG. 8 is a diagrammatic depiction of a system for linking a first autonomous network system and at least one second autonomous network system in accordance with a third embodiment of the present invention.

Referring to FIG. 8, an alternate third embodiment of the present invention is disclosed. Again, the system elements and connections and shown in FIG. 8 are identical to the system elements and connections depicted in FIG. 2, and therefore, a description of the elements and their connections is omitted for brevity's sake. The third embodiment discloses a method for removing extraneous parts of the topology of system 10. As shown, one access circuit from each NOC may be eliminated. Either NOC can use the other NOC's access circuit to reach the customer network.

Depending on the routing configuration, it may also be possible to eliminate one of the NOC routers, or to use a smaller router simply as a backup. In another embodiment, an NMS is eliminated at each NOC, as well. Note that these reductions are implemented per-domain. Thus, savings accrue for each domain used in system 10 or system 10'.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A system for linking a first autonomous network system and at least one second autonomous network system, the first autonomous network system having a first private IP address space and the at least one second autonomous network system having at least one second private IP address space, the first private IP address space and the at least one second private IP address space at least partially overlapping, the system comprising:
   a first routing domain including the first autonomous network system;
   at least one second routing domain including the at least one second autonomous network system; and
   a geographically diverse linking autonomous system coupling the first autonomous network system and the at least one second autonomous network system, the linking autonomous system includes a first routing domain management system configured to manage the first routing domain and at least one second routing domain management system configured to manage the at least one second routing domain.

2. The system of claim 1, wherein the first autonomous network system includes a plurality of first private networks, each of the plurality of first private networks having a different private IP address space.

3. The system of claim 1, wherein the at least one second autonomous network system includes a plurality of second private networks, each of the plurality of private networks having a different private IP address space.

4. The system of claim 1, wherein the at least one second autonomous network system includes a plurality of autonomous network systems.

5. The system of claim 4, wherein each of the plurality of autonomous network systems includes a plurality of private networks, each of the plurality of private networks having a different private IP address space.

6. The system of claim 1, wherein the geographically diverse linking autonomous system further comprises a first multiple-domain Network-Operations-Center (NOC) disposed at a first site, the first multiple-domain NOC being configured to support the first routing domain and the at least one second routing domain from the first site.

7. The system of claim 6, wherein the first multiple-domain NOC including a first-site first-domain management system coupled to the first autonomous network system, and at least one first-site second-domain management system coupled to the at least one second autonomous network system.

8. The system of claim 7, wherein the at least one first-site second-domain management system includes a plurality of domain management systems, each of the plurality of domain management systems being configured to manage one of the plurality of autonomous network systems.

9. The system of claim 7, wherein the at least one second routing domain includes a plurality of routing domains, each of the plurality of routing domains corresponding to one of the plurality of autonomous network systems.

10. The system of claim 6, wherein the geographically diverse linking autonomous system further comprises:
    at least one second multiple-domain Network-Operations-Center (NOC) disposed in at least one second site geographically diverse from the first site, the at least one second multiple domain NOC being configured to support the first routing domain and the at least one second routing domain from the at least one second site; and
    a transit network coupling the first multiple domain NOC to the at least one second multiple-domain NOC.

11. The system of claim 10, wherein the at least one second autonomous network system includes a plurality of autonomous network systems.

12. The system of claim 10, wherein the at least one second multiple domain NOC includes a second-site first-domain management system coupled to the first autonomous network system, and at least one second-site second-domain management system coupled to the at least one second autonomous network system.

13. The system of claim 12, wherein the at least one second autonomous network system includes a plurality of autonomous network systems and the at least one first-site second-domain management system includes a plurality of first-site second domain management systems, each of the plurality of first-site second domain management systems servicing one of the plurality of autonomous network systems.

14. The system of claim 13, wherein the at least one second-site second-domain management system includes a plurality of second-site domain management systems, each of the plurality of second-site domain management systems servicing one of the plurality of autonomous network systems.

15. The system of claim 10, wherein the at least one second multiple-domain NOC includes a plurality of NOCs, each of the plurality of NOCs being disposed at a diverse geographical location.

16. The system of claim 15, wherein each of the plurality of NOCs includes N domain management systems, N being an integer, each of the N domain management systems being configured to service one autonomous network system.

17. The system of claim 10, wherein the transit network includes private IP address space.

18. The system of claim 17, wherein the first multiple domain NOC is coupled to the at least one second multiple domain NOC by at least one interface tunnel.

19. The system of claim 18, wherein the at least one interface tunnel is IPsec encrypted.

20. The system of claim 18, wherein the at least one interface tunnel is characterized by a public IP address.

21. The system of claim 10, wherein each of the first multiple domain NOC, the at least one second multiple domain NOC, and the transit network include at least one router configured as an internal Border Gateway Protocol (iBGP) speaker, each of the at least one routers being meshed to form the autonomous network system.

22. The system of claim 21, wherein iBGP speakers in the first multiple domain NOC and iBGP speakers in the at least one second multiple domain NOC are established in a iBGP peering relationship.

23. The system of claim 21, wherein the iBGP speakers are configured to employ Local-Preference attributes.

24. The system of claim 21, wherein the iBGP speakers are configured to employ Multi-Exit Discriminators.

25. A method for linking a first autonomous network system and at least one second autonomous network system, the at least one first autonomous network system having a first private IP address space and the at least one second autonomous network system having a second private IP address space, the first private IP address space and the second private IP address space at least partially overlapping, the method comprising:
   implementing a first routing domain including the first autonomous network system;
   implementing at least one second routing domain including the at least one second autonomous network system; and
   providing a geographically diverse linking autonomous system coupled to the first autonomous network system and the at least one second autonomous network system, the linking autonomous system includes a first routing domain management system configured to manage the first routing domain and at least one second routing domain management system configured to manage the at least one second routing domain.

26. The method of claim 25, wherein the first autonomous network system includes a plurality of first private networks, each of the plurality of first private networks having a different private IP address space.

27. The method of claim 25, wherein the at least one second autonomous network system includes a plurality of second private networks, each of the plurality of private networks having a different private IP address space.

28. The method of claim 25, wherein the at least one second autonomous network system includes a plurality of autonomous network systems.

29. The method of claim 28, wherein each of the plurality of autonomous network systems includes a plurality of private networks, each of the plurality of private networks having a different private IP address space.

30. The method of claim 25, wherein the step of providing includes:
   coupling a first multiple-domain NOC to the first autonomous network system and the at least one second autonomous network system, the first multiple-domain NOC being configured to support the first routing domain and the at least one second routing domain from the first site, whereby the first multiple-domain is disposed at a first site;
   coupling at least one second multiple domain NOC to the first autonomous network system and the at least one second autonomous network system, the at least one second multiple domain NOC being configured to support the first routing domain and the at least one second routing domain, whereby the at least one second multiple-domain NOC is disposed in at least one second site geographically diverse from the first site; and
   providing a transit network coupling the first multiple domain NOC and the at least one second multiple domain NOC.

31. The method of claim 30, wherein the step of providing further comprises:
   equipping each of the first multiple-domain NOC, the at least one second multiple-domain NOC, and the transit network with at least one router; and
   configuring each of the at least one routers as an internal Border Gateway Protocol (iBGP) speaker, whereby the at least one routers are meshed to form the autonomous network system.

32. The method of claim 31, wherein iBGP speakers in the first multiple domain NOC and iBGP speakers in the at least one second multiple domain NOC are established in a iBGP peering relationship.

33. The method of claim 31, wherein the iBGP speakers are configured to employ Local-Preference features.

34. The method of claim 31, wherein the iBGP speakers are configured to employ Multi-Exit Discriminators.

35. The method of claim 30, wherein the step of providing includes the step of coupling the first multiple domain NOC to the at least one second multiple domain NOC by at least one interface tunnel.

36. The method of claim 35, wherein the at least one interface tunnel is IPsec encrypted.

37. The method of claim 35, wherein the at least one interface tunnel is characterized by a public IP address.

38. The method of claim 30, further comprising the step of exchanging first data between the first multiple domain NOC, and at least one of the first autonomous network system and the at least one second autonomous network system.

39. The method of claim 38, wherein the step of exchanging first data is performed via a first direct routing path that does not include the transit network.

40. The method of claim 38, wherein the step of exchanging first data further comprises the steps of:
   detecting a fault condition in the first direct routing path;
   coupling the first multiple domain NOC to the at least one second multiple domain NOC with an interface tunnel traversing the transit network; and
   exchanging first site data via the interface tunnel.

41. The method of claim 40, wherein the interface tunnel is IPsec encrypted.

42. The method of claim 30, further comprising the step of exchanging second data between the at least one second multiple domain NOC, and at least one of the first autonomous network system and the at least one second autonomous network system.

43. The method of claim 42, wherein the step of exchanging second site data is performed via a second direct routing path that does not include the transit network.

44. The method of claim 42, wherein the step of exchanging second site data further comprises the steps of:
   detecting a fault condition in the second direct routing path;
   coupling the at least one second multiple domain NOC to the first multiple domain NOC with an interface tunnel traversing the transit network; and exchanging second site data via the interface tunnel.

45. The method of claim 44, wherein the interface tunnel is IPsec encrypted.

46. A method for linking a first autonomous network system having a first private IP address space and a second autonomous network system having a second private IP address space, the method comprising:
   providing a system for linking the first autonomous network system with the second autonomous network system, the system including a first multiple domain management system disposed at a first location, a transit network coupled to the first multiple domain network management system, and a second multiple domain management system coupled to the transit network, the second multiple domain management system being disposed at a second location;

transmitting a packet from the first autonomous network system to the first multiple domain management system, the packet including a customer data payload portion and a header portion, the header portion including destination data corresponding to the second autonomous network system;

encapsulating the packet in a tunnel packet, the tunnel packet including a public first multiple domain management system source address and a public second multiple domain management system destination address; and transmitting the tunnel packet across the transit network.

47. The method of claim 46, further comprising the steps of:

removing the tunnel packet at the second multiple domain management system; and transmitting the packet from the second multiple domain management system to the second autonomous network system.

48. The method of claim 46, wherein the tunnel packet is IPsec encrypted.

49. A computer readable medium having stored thereon a packet structure for use in telecommunications network management system, when executed by a computer caused linking autonomous network systems having a private IP address space, the packet structure comprising:

a tunnel packet field containing public IP address data corresponding to a public first network management system source address and a public second network management system destination address;

a second header field encapsulated within a first header field, the second header field containing an source client address data, autonomous network source address, a first network management system address, an autonomous network system destination address data, and destination client address data; and a customer data payload field.

* * * * *